UNITED STATES PATENT OFFICE.

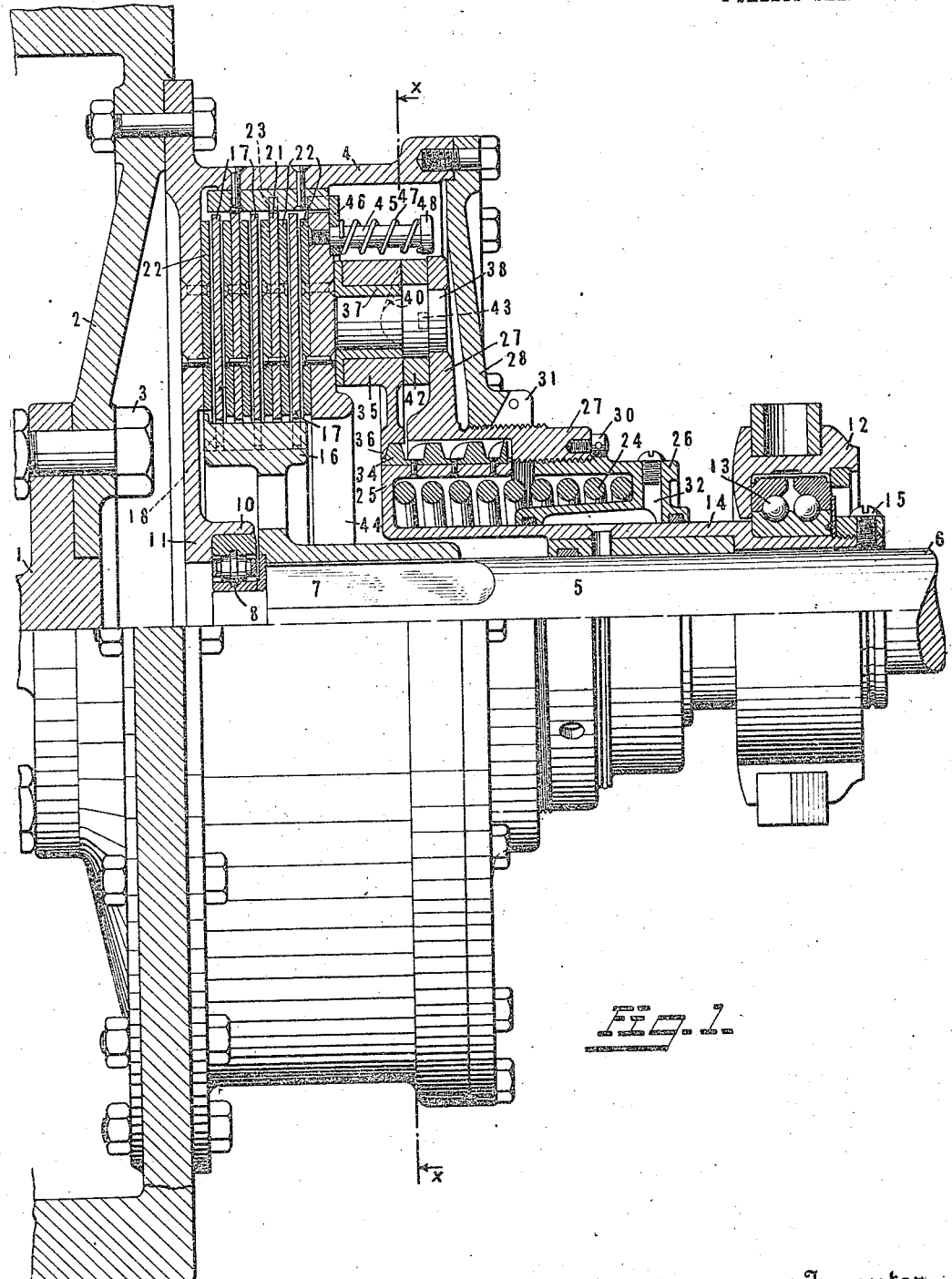

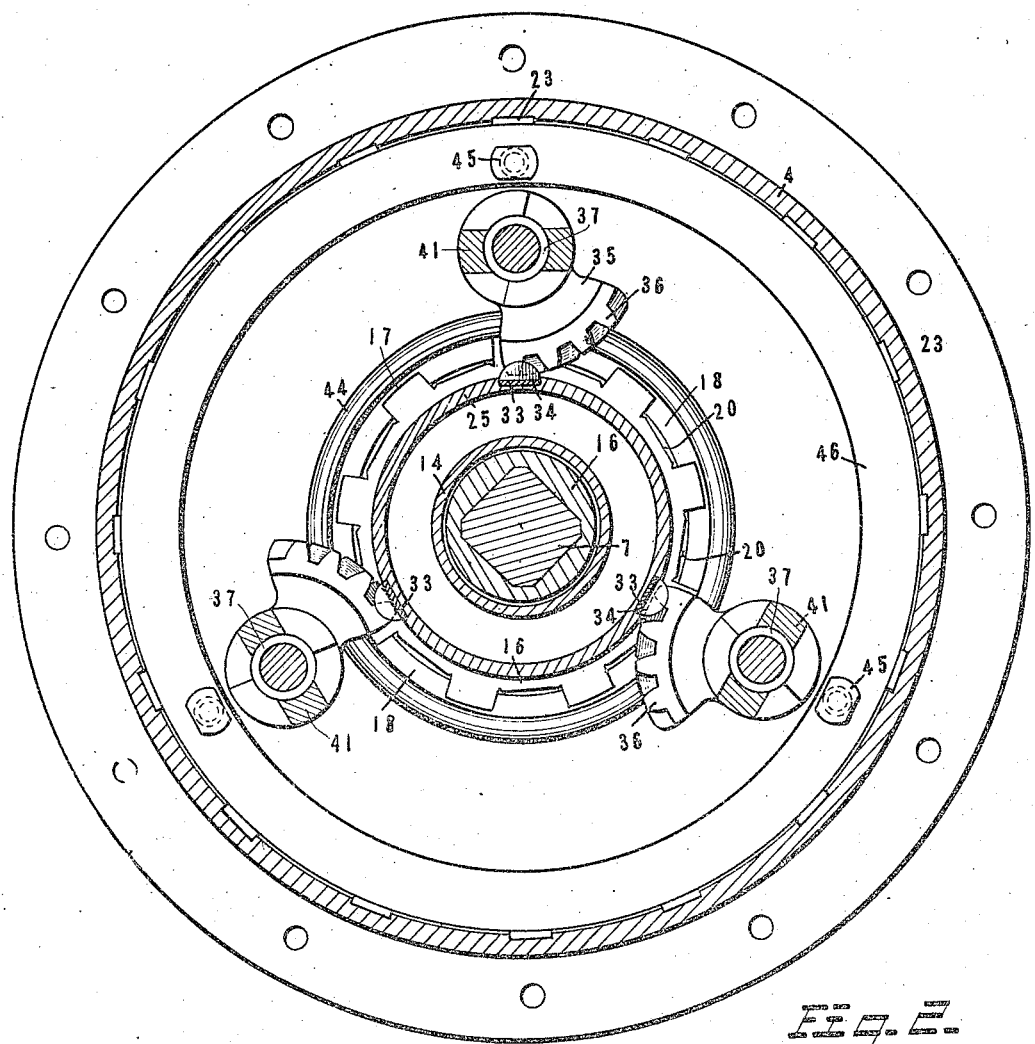
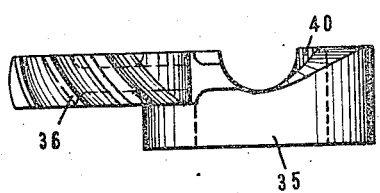

GILBERT J. SCOFIELD, OF ELMIRA, NEW YORK, ASSIGNOR TO THE HILLIARD CLUTCH & MACHINERY CO., OF ELMIRA, NEW YORK, A CORPORATION OF NEW YORK.

CLUTCH.

1,134,699.  Specification of Letters Patent.  Patented Apr. 6, 1915.

Application filed April 5, 1913. Serial No. 759,032.

*To all whom it may concern:*

Be it known that I, GILBERT J. SCOFIELD, a citizen of the United States, residing at Elmira, in the county of Chemung and State of New York, have invented certain new and useful Improvements in Clutches, of which the following is a full, clear, and exact description, such as will enable others skilled in the art to which it appertains to make and use the same.

This invention relates to clutches, and with regard to certain more specific features thereof, to friction clutches of the disk type.

One of the objects of this invention is to provide a practical clutch of the above character, the parts of which may be easily made and assembled, thus reducing the cost of manufacture.

Another object is to provide a simple clutch of the above character which will be dust-proof and efficient in operation.

A further object is to provide a friction clutch in which the component parts thereof may be conveniently separated into units for replacing, cleaning and repairing as may be necessary.

A further object is to provide practical means for mounting and connecting various parts so as to enhance their ease in movement and reduce wear.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is shown one of various possible embodiments of this invention, Figure 1 is a combined sectional and elevational longitudinal view, the flange of the fly-wheel being broken away; Fig. 2 is a transverse sectional view taken on the line X—X, Fig. 1; and Fig. 3 is a detail view of one of the parts of the mechanism.

Similar reference characters refer to similar parts throughout the different views of the drawings.

The present invention is particularly adapted for use on automobiles and motor vehicles of various kinds in which a source of power, such as a gasolene engine, is adapted to be connected and disconnected under various circumstances with a suitable form of propelling means, although it is, of course, to be understood that the invention is susceptible to various uses and applications.

In Fig. 1, there is shown a main driving shaft 1 adapted to be driven by any suitable form or source of power (not herein shown). This shaft is provided with a fly-wheel 2 at one end secured thereto by means of bolts 3. To the web of the fly-wheel is secured a casing 4 containing the coacting clutch members, which will hereinafter be more fully described. A driven shaft 5, in alinement with the driving shaft 1, is adapted to be connected at its outer end 6 with transmission mechanism while its opposite end 7 is positioned within the casing 4. The end 7 of the shaft is preferably reduced, as indicated, and provided with roller bearings 8 held in a suitable retainer coacting with a collar or flange 10 formed integrally with the rear wall 11 of the casing 4.

Around the central part of the driven shaft 5 is mounted a trunnion ring 12 which is connected with an actuating lever in the usual manner. This ring is mounted upon roller bearings 13 engaging an intermediate sleeve 14 secured thereto by set-screw 15 to permit the turning of the driven shaft relatively to the ring 12. This trunnion ring 12 and the intermediate sleeve 14 are adapted to be moved longitudinally with respect to the driven shaft 5 in the usual manner to throw the clutch in and out as desired.

Broached on the square end 7 of the driven shaft is a hub 16, about the periphery of which are a plurality of friction plates 17. These plates in the present modification are three in number and are preferably made of saw-blade steel. As shown in Fig. 2, it will be seen that the plates 17 are splined on the hub by means of a plurality of projections 18 engaging corresponding grooves 20 about the periphery of the hub 16 to permit a relative longitudinal movement thereof as the plates are compressed or separated during the operation of the clutch mechanism. These plates 17 coact with the opposite sides of interposed friction plates 21 mounted upon the casing 4. These plates are also preferably made of saw-blade steel and have lagged thereon rings or plates of non-burnbestos 22, or other similar suitable material of a non-combustible nature, possessing a high co-efficient of friction. These plates, like the coacting plates, are splined by means of lugs 23 bolted to the cylindrical wall of the casing 4 engaging corresponding recesses in the plates. It will thus be seen that these two sets of alternating plates may have a relative movement with respect to the rear wall 11 of the casing.

Fig. 1 shows the clutch in released position for the sake of clearness. It will be understood, however, that this clutch, like many forms of clutches used in motor vehicles, occupies a normally connected or clutched position. This position is obtained by means of a spring 24 coiled about the intermediate sleeve 14 and preferably housed in a dust-proof casing formed by the backwardly turned flange 25 of the sleeve and an oppositely curved flange 26 loosely mounted upon the sleeve 14. This second-mentioned flange has a threaded connection with an adjusting plate 27, which, in turn, has a threaded connection with the outer wall 28 of the casing 4. A lock nut 30 and a clamping ring 31 hold these parts in proper position and also provide a dust-proof construction. A lubricating cup 32 is also provided between the sleeve 14 and flange 26. It will thus be seen that a compression of the spring will react on the opposite wall 11 of the casing, the strain being transmitted through the casing 4 and wall 28.

As herein shown (Fig. 2), the sleeve 14 is provided with three rack members 33 riveted thereto, disposed at substantially 120° apart thereabout, each having short inclined teeth 34. Each of these rack members coacts with a gear sector 35 (Fig. 3), having inclined teeth 36, mounted upon a bushing 37 which, in turn, is mounted upon a stud 38 carried by the adjusting plate 27. This gear sector is provided on one face with diametrically oppositely disposed concave cam surfaces 40, into which project rounded projections or co-acting cam members 41 integrally formed with a ring 42 interposed between the gear sector 35 and the adjusting plate 27 and held in place by the supporting stud 38. This cam member is held against relative rotation by means of a square recess 43 engaging a square tooth formed upon the adjusting plate, as shown by dotted lines. It will thus be seen that as the rack members move toward the flywheel under the action of the coil spring 24, they will cause a relative rotation of the gear sectors 35 and the coacting cam members 40, 41 associated therewith will urge the gear sector and bushing 37 rearwardly along the cylindrical surface of the studs on which they are mounted. This will force a pressure plate 44, which is notched to accommodate the splining lugs 23, in the same direction and cause a compression of the coacting disk members carried by the driving and driven members respectively. A plurality of pins 45 arranged at equal distances about the periphery or outer edge of the pressure plate and passing through an auxiliary retaining ring 46 will tend to restore the parts to released position under the action of coil springs 47 positioned between the ring 46 and the head 48 of the pin 45 when the clutch is thrown out.

The method of use and operation of a clutch of this character is substantially as follows:—Assuming the engine to be running and the device in its normal or clutched position, pressure applied to an actuating lever in the usual manner will cause the trunnion ring 12 to move toward the right and compress the coil spring 24 about the driven shaft 5. This releasing movement will cause the rack members 33 to co-act with their respective gear sectors 36 and rotate them about the studs 38 upon which they are mounted to the position shown in Fig. 1. The cam members 40, 41 move to the position shown to release the pressure upon the coacting disk members which are moved to separated position by means of the releasing or auxiliary springs 47 reacting against the ring 46. When it is again desired to throw in the clutch, the actuating lever is released and the trunnion ring 12 will be moved toward the left under the action of the coil spring 24, causing the racks to rotate the gear sectors in the opposite direction and compress the friction disks. The rapidity and efficiency with which the clutch members act may be, of course, regulated by the speed and strength with which the actuating lever is operated.

It will be noted from the drawings that the various parts of the present device are secured to each other and to the fly-wheel to permit the ready removal or assembling of parts as may be necessary for cleaning or repairing. Thus, by removing the nuts and bolts holding the cover plate 28 to the casing 4, the trunnion ring 12, together with the rack and gear sector mechanism, may be bodily moved toward the right along the driven shaft. This will permit access to the friction plates which may be removed from the hub on the driven member and the retaining devices on the driving member on which they are mounted. The cover plate may be readily unscrewed from the adjusting plate by removal of the locking ring 31. Likewise the adjusting plate may be unscrewed from the housing of the coil spring on releasing the lock nut 30. A relative longitudinal movement of the driving and driven members will permit further separation of the parts.

It will thus be seen that this invention provides a simple and reliable clutch mechanism of inexpensive and dust-proof construction well suited to meet the requirements of hard practical use and adapted to accomplish, among others, all of the objects and advantages above set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a clutch mechanism, in combination, a driving member, a driven member, alternating coacting disks carried by said members, a dust-proof casing inclosing said disks and mounted upon one of said members, a rack and gear mechanism, means within said casing for actuating said rack and gear mechanism to urge said disks into compressed relation, and means without said casing adapted to be actuated to compress said last-mentioned means to permit the disks to move to separated position.

2. In a clutch mechanism, in combination, a driving member, a casing carried thereby, a driven member projecting within said casing, coacting friction members carried by the casing and the driven member respectively, and means within said casing adapted to cause the coacting friction members to move into clutched relation, said means comprising cam members reacting upon the casing and one of said friction members.

3. In a clutch mechanism, in combination, a driving member, a casing carried thereby, a driven mechanism projecting within said casing, coacting friction members carried by the casing and the driven member respectively, and means within said casing adapted to cause the coacting friction members to move into clutched relation, said means comprising a rack and gear mechanism and means for actuating said rack and gear mechanism for forcing said friction members into coacting relation.

4. In a clutch mechanism, in combination, a driving member, a driven member, a dust-proof casing carried by said driving member, a sleeve mounted on the driven member and closely fitting said casing and said driven member to form a dust-proof connection, coacting friction surfaces carried by the casing and the driven member respectively, means normally adapted to urge said friction surfaces into compressed relation, and means whereby said sleeve may be moved with respect to said driven member to separate said friction surfaces.

5. In a clutch mechanism, in combination, a driving member, a driven member, a dust-proof casing carried by said driving member, a sleeve mounted on the driven member and closely fitting said casing and said driven member to form a dust-proof connection, coacting friction surfaces carried by the casing and the driven member respectively, means normally urging said friction surfaces into compressed relation, means whereby said sleeve may be moved with respect to said driven member to separate said friction surfaces, a spring housed within said casing normally acting upon said friction surfaces adapted to be compressed to permit a separation of said surfaces, and auxiliary spring means coacting with the casing and one of said friction surfaces to aid in the separation of said surfaces as said spring is compressed.

6. In a clutch mechanism, in combination, a driving member, a driven member, coacting friction surfaces carried thereby, and means normally urging said surfaces into compressed relation comprising a fixed cam, a gear member having a coacting cam surface and means for rotating said gear member with respect to said fixed cam.

7. In a clutch mechanism, in combination, a driving member, a driven member, coacting friction surfaces carried thereby, and means normally urging said surfaces into compressed relation comprising a fixed cam, a gear member having a coacting cam surface and a rack member coacting with said gear member adapted to cause a rotation of said gear member with respect to the fixed cam.

8. In a clutch mechanism, in combination, a driving member, a driven member, coacting friction surfaces carried thereby, and means normally urging said surfaces into compressed relation comprising a fixed cam, a gear member having a coacting cam surface, a rack member coacting with said gear member adapted to cause a rotation of said gear member with respect to the fixed cam and a spring adapted to act upon said rack member for moving the same with respect to said gear member.

9. In a clutch mechanism, in combination, a driving member, a casing carried thereby, a driven member projecting within said casing, coacting friction plates carried by said casing and driven member, and means normally urging said plates into compressed relation, said means comprising a rigid member carried by said casing, a cam carried by said member, a gear having coacting cam surfaces, and means for rotating said gear with respect to said cam to compress the friction plates.

10. In a clutch mechanism, in combination, a driving member, a casing carried thereby, a driven member projecting within said casing, coacting friction plates carried by said casing and driven member, and means normally urging said plates into compressed relation, said means comprising a rigid member carried by said casing, a cam carried by said member, a gear having coacting cam surfaces, means for rotating said gear with respect to said cam to compress the friction plates, and a spring-actuated rack acting upon said gear adapted to rotate the same.

11. In a clutch mechanism, in combination, a driving member, a casing carried thereby, a driven member projecting within said casing, coacting friction plates carried by said casing and driven member, and means normally urging said plates into compressed relation, said means comprising a rigid member carried by said casing, a cam carried by said member, a gear having coacting cam surfaces, means for rotating said gear with respect to said cam to compress the friction plates, a spring-actuated rack acting upon said gear adapted to rotate the same and means movable longitudinally with respect to said driven member adapted to compress the spring to permit a separation of said friction plates.

In testimony whereof I affix my signature, in the presence of two witnesses.

GILBERT J. SCOFIELD.

Witnesses:
  P. A. BLAIR,
  C. J. KULBERG.